T. E. MURRAY.
METHOD OF WELDING A THREADED TUBE IN A SLEEVE OR FERRULE.
APPLICATION FILED DEC. 14, 1916.

1,220,772.  Patented Mar. 27, 1917.

Inventor
Thomas E. Murray
By his Attorney
Park Benjamin

UNITED STATES PATENT OFFICE.

THOMAS E. MURRAY, OF NEW YORK, N. Y.

METHOD OF WELDING A THREADED TUBE IN A SLEEVE OR FERRULE.

1,220,772.  Specification of Letters Patent.  Patented Mar. 27, 1917.

Application filed December 14, 1916. Serial No. 136,866.

*To all whom it may concern:*

Be it known that I, THOMAS E. MURRAY, a citizen of the United States, residing at New York, in the county of New York and State of New York, have invented a certain new and useful Improvement in Methods of Welding a Threaded Tube in a Sleeve or Ferrule, of which the following is a specification.

The invention is a method of welding an externally threaded pipe or tube in an internally threaded sleeve or ferrule having an internal rib, and consists in the several steps performed as set forth in the claims.

In the accompanying drawings—

Figure 1:
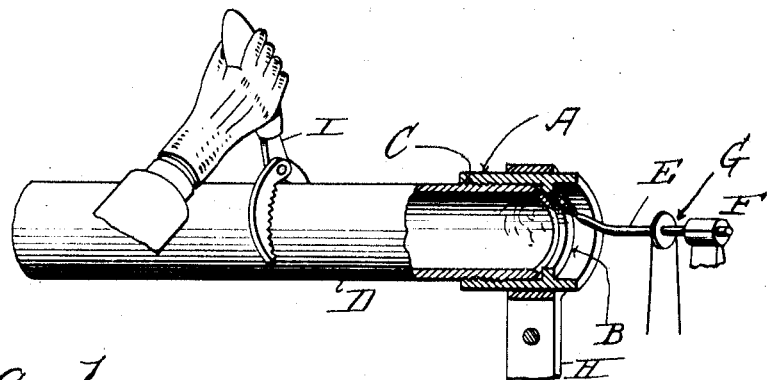
Figure 2:
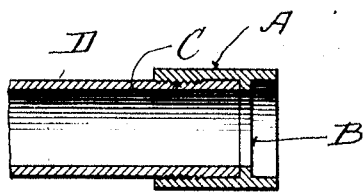

Figure 1 is a perspective view of a pipe or tube and of a ferrule or sleeve thereon illustrating my method, the end portion of said pipe and ferrule being broken away and in section. Fig. 2 is a longitudinal section of the united tube and sleeve.

Similar letters of reference indicate like parts.

A is a sleeve or ferrule provided internally with a rib B and threaded at C. D is the exteriorly threaded tube to be united to said ferrule. E is a bent acetylene burner or blow-pipe supported in a suitable bearing F and rotated by a pulley and belt G, or by any other suitable means.

In carrying my method into effect, I hold the sleeve or ferrule A in fixed position by means, for example, of a vise, indicated at H. I insert the tube D in engagement with the thread C, and move the same inwardly until the butt end of the tube is in proximity to but not in contact with the rib B. For this purpose I use a wrench I engaging the tube and manually operated.

The tube being adjusted, as above stated, I insert the acetylene burner or blow-pipe E into the opposite end of the tube, and after igniting the gas, set said burner in rotation to produce a flame to impinge on rib B and to sweep around the same, thus heating said rib and also the end of tube A. As soon as the joint appears to be at welding heat, I quickly rotate the tube D by means of wrench I so as to bring the butt end of said tube with strong pressure against said rib, thus causing said tube end and said rib to become welded together.

I claim:

1. The method of welding an externally threaded tube in an internally threaded ferrule or sleeve having an internal rib, which consists in engaging said tube with the thread in said sleeve and rotating said tube to move the end thereof into proximity with said rib, raising the joint to welding temperature, and then rotating said tube to carry and press the end thereof into contact with said rib.

2. The method of welding an externally threaded tube in an internally threaded ferrule or sleeve having an internal rib, which consists in engaging said tube with the thread in said sleeve and rotating said tube to move the end thereof into proximity to said rib, applying to the interior of said sleeve a rotating flame to sweep around said rib until the joint is raised to welding heat, and then rotating said tube to carry and press the end thereof into contact with said rib.

In testimony whereof I have affixed my signature in presence of two witnesses.

THOMAS E. MURRAY.

Witnesses:
 GERTRUDE T. PORTER,
 MAY T. McGARRY.